United States Patent
Hisamitsu et al.

(10) Patent No.: US 8,426,060 B2
(45) Date of Patent: Apr. 23, 2013

(54) LAMINATE CELL, ASSEMBLED BATTERY, BATTERY MODULE AND ELECTRIC VEHICLE

(75) Inventors: Yasunari Hisamitsu, Yokosuka (JP); Takaaki Abe, Yokosuka (JP); Takanori Ito, Zushi (JP); Osamu Shimamura, Yokohama (JP); Takamitsu Saito, Yokohama (JP); Hideaki Horie, Yokosuka (JP); Hiroshi Sugawara, Yokosuka (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 44 days.

(21) Appl. No.: 12/824,763

(22) Filed: Jun. 28, 2010

(65) Prior Publication Data
US 2010/0263201 A1 Oct. 21, 2010

Related U.S. Application Data

(62) Division of application No. 12/791,641, filed on Jun. 1, 2010, now abandoned, which is a division of application No. 10/640,029, filed on Aug. 14, 2003.

(30) Foreign Application Priority Data

Aug. 26, 2002 (JP) .................. P2002-245539

(51) Int. Cl.
*H01M 2/02* (2006.01)
(52) U.S. Cl.
USPC ............ 429/178; 429/179; 429/180; 429/160
(58) Field of Classification Search .................. 429/178, 429/179, 180, 163
See application file for complete search history.

(56) References Cited

U.S. PATENT DOCUMENTS 4,708,812 A 11/1987 Hatfield
4,738,906 A 4/1988 Sanders
(Continued)

FOREIGN PATENT DOCUMENTS

JP 2000-082495 3/2000
JP 2000-138053 5/2000
(Continued)

OTHER PUBLICATIONS

Japanese Notification of Reasons for Refusal, w/ English translation thereof, issued in Japanese Patent Application No. 2002-245539 dated on Aug. 12, 2008.
(Continued)

*Primary Examiner* — Jane Rhee
(74) *Attorney, Agent, or Firm* — McDermott Will & Emery LLP

(57) ABSTRACT

A laminate cell comprises a power generating element formed by sequentially stacking positive electrode plates and negative electrode plates while interposing separators therebetween; a positive tab connected to the positive electrode plates through a plurality of positive leads; a negative tab connected to the negative electrode plates through a plurality of negative leads; and a cell package formed of a metal composite film, the cell package hermetically sealing the power generating element and an electrolyte. According to the laminate cell, the heat capacity of a portion of the positive tab, onto which a plurality of the positive leads are joined, and the heat capacity of a portion of the negative tab, onto which a plurality of the negative leads are joined, are made larger than that of other portions of the positive tab and the negative tab.

3 Claims, 7 Drawing Sheets

U.S. PATENT DOCUMENTS

| | | |
|---|---|---|
| 5,449,571 A | 9/1995 | Longardner et al. |
| 5,565,132 A | 10/1996 | Salyer |
| 6,099,894 A | 8/2000 | Holman |
| 6,255,015 B1 | 7/2001 | Corrigan et al. |
| 6,387,567 B1 | 5/2002 | Noh |
| 6,447,958 B1 | 9/2002 | Shinohara et al. |
| 6,743,546 B1 | 6/2004 | Kaneda et al. |
| 2002/0081491 A1 | 6/2002 | Gross et al. |
| 2003/0031926 A1 | 2/2003 | Farmer et al. |

FOREIGN PATENT DOCUMENTS

| | | |
|---|---|---|
| JP | 2000-200585 A | 7/2000 |
| JP | 2000-235850 | 8/2000 |
| JP | 2000235850 A * | 8/2000 |
| JP | 2001-052659 | 2/2001 |
| JP | 2001-052663 | 2/2001 |
| JP | 2001-076706 | 3/2001 |
| JP | 2002-008629 | 1/2002 |
| JP | 2002-042775 | 2/2002 |
| WO | WO 00/59063 | 10/2000 |
| WO | WO 01/59855 A1 | 8/2001 |

OTHER PUBLICATIONS

United States Office Action issued in U.S. Appl. No. 12/791,641, mailed Aug. 26, 2010.

United States Office Action issued in U.S. Appl. No. 12/791,641 dated Mar. 10, 2011.

* cited by examiner

LAMINATE CELL, ASSEMBLED BATTERY, BATTERY MODULE AND ELECTRIC VEHICLE

RELATED APPLICATIONS

This application is a Divisional of U.S. application Ser. No. 12/791,641, filed on Jun. 1, 2010, now abandoned which is a Divisional of U.S. application Ser. No. 10/640,029, filed on Aug. 14, 2003, which is now abandoned, claiming priority of Japanese Patent Application No. 2002-245539, filed on Aug. 26, 2002, the entire contents of each of which are hereby incorporated by reference.

BACKGROUND OF THE INVENTION

1. Field of the Invention

The present invention relates to a laminate cell having a structure, in which pluralities of positive and negative electrode plates are alternately stacked while interposing separators therebetween to configure a power generating element, and the positive and negative electrode plates of the power generating element are connected to positive and negative tabs through pluralities of positive and negative leads, respectively. The present invention also relates to an assembled battery, a battery module and an electric vehicle, all of which use this laminate cell.

2. Description of the Related Art

In recent years, an electric vehicle which uses electricity as a power source and a hybrid car which runs by a combination of an engine and a motor have attracted attention due to the global problem of environmental air pollution caused by automobile exhaust gas. Thus, the development of a high-power battery to be mounted in these types of vehicles, which achieves high energy/power densities, occupies an important position in the industry.

Regarding this type of high-power battery, for example, there is a lithium ion battery. Specifically, among this type of battery, there is a laminate cell formed by stacking flat positive and negative electrode plates upon one another while interposing separators therebetween.

As for this laminate cell, one disclosed in Japanese Patent Application Laid-Open No. 2000-200585 has been proposed, which uses, as a cell package, a laminate film formed by stacking a metal film and a polymer film. In this specification, the laminate film is referred to as a metal composite film. This laminate cell is constructed in a such manner that a power generating element composed of positive and negative electrode plates and separators, all of which have an approximately rectangular flat shape, are hermetically sealed together with an electrolyte by the cell package made of the metal composite film, and a positive tab connected to the positive electrode plates of the power generating element and a negative tab connected to the negative electrode plates thereof are drawn outward from the end edges of the cell package.

The laminate cell thus constructed has an advantage in that it is easier to reduce the weight and thickness thereof in comparison with one which uses a metal can as the cell package.

Incidentally, in the laminate cell thus constructed, it is common that the respective positive electrode plates of the power generating element are connected to the positive tab through positive leads, and the respective negative electrode plates thereof are connected to the negative tab through negative leads. Specifically, in this type of laminate cell, one end of the positive tab is drawn to the outside of the cell package, and onto the other end thereof, the plurality of positive leads from the respective positive electrode plates of the stacked electrode are joined. Moreover, one end of the negative tab is drawn to the outside of the cell package, and onto the other end thereof, the plurality of negative leads from the respective negative electrode plates of the stacked electrode are joined.

SUMMARY OF THE INVENTION

However, in the laminate cell as described above, heat generated when a large current is carried therethrough tends to concentrate in the other ends of the positive and negative tabs, and the temperatures of the other ends of these positive and negative tabs sometimes increase to a great extent. Thus, when the temperatures of the other ends of these positive and negative tabs are increased to an excessive extent, it is assumed that, due to the heat generated at the positive and negative tabs, the polymer film within the metal composite film constituting the cell package is melted, the metal film is exposed, and a short circuit occurs between this metal film and the positive or negative tab, or between the metal film and the positive or negative leads.

The present invention was made in consideration of the above-described problems. It is an object of the present invention to provide a highly reliable laminate cell which avoids the problem of an occurrence of a short circuit between the metal film of the metal composite film for use in the cell package and the positive or negative tab, or between the metal film and the positive or negative leads, and to provide an assembled battery, a battery module and an electric vehicle, all of which use this laminate cell.

The first aspect of the present invention provides a laminate cell, comprising: a power generating element formed by sequentially stacking positive electrode plates and negative electrode plates while interposing separators therebetween; a positive tab connected to the positive electrode plates through a plurality of positive leads; a negative tab connected to the negative electrode plates through a plurality of negative leads; and a cell package formed of a metal composite film, the cell package hermetically sealing the power generating element and an electrolyte, wherein a heat capacity of a portion of the positive tab, onto which a plurality of the positive leads are joined, and a heat capacity of a portion of the negative tab, onto which a plurality of the negative leads are joined, are made larger than that of other portions of the positive tab and the negative tab.

The second aspect of the present invention provides a laminate cell, comprising: a power generating element formed by sequentially stacking positive electrode plates and negative electrode plates while interposing separators therebetween; a positive tab connected to the positive electrode plates through a plurality of positive leads; a negative tab connected to the negative electrode plates through a plurality of negative leads; and a cell package formed of a metal composite film hermetically sealing the power generating element and an electrolyte, wherein insulating tapes having an electrical insulating property are adhered to a portion of the positive tab, onto which the plurality of positive leads are joined, and a portion of the negative tab, onto which the plurality of negative leads are joined.

The third aspect of the present invention provides an assembled battery, comprising: a single cell including a power generating element formed by sequentially stacking positive electrode plates and negative electrode plates while interposing separators therebetween; a positive tab connected to the positive electrode plates through a plurality of positive leads; a negative tab connected to the negative electrode plates through a plurality of negative leads; and a cell package formed of a metal composite film, the cell package hermetically sealing the power generating element and an electrolyte, wherein a heat capacity of a portion of the positive tab, onto which a plurality of the positive leads are joined, and a heat capacity of a portion of the negative tab, onto which a plurality of the negative leads are joined, are made larger than that of other portions of the positive tab and the negative tab, and the assembled battery is formed by interconnecting any of a plurality of the single cells and a plurality of single cell groups electrically in series, each of the single cell group being formed by interconnecting a plurality of the single cells electrically in parallel.

The fourth aspect of the present invention provides a battery module, comprising: an assembled battery having a single cell including a power generating element formed by sequentially stacking positive electrode plates and negative electrode plates while interposing separators therebetween; a positive tab connected to the positive electrode plates through a plurality of positive leads; a negative tab connected to the negative electrode plates through a plurality of negative leads; and a cell package formed of a metal composite film, the cell package hermetically sealing the power generating element and an electrolyte, wherein a heat capacity of a portion of the positive tab, onto which a plurality of the positive leads are joined, and a heat capacity of a portion of the negative tab, onto which a plurality of the negative leads are joined, are made larger than that of other portions of the positive tab and the negative tab, the assembled battery is formed by interconnecting any of a plurality of the single cells and a plurality of single cell groups electrically in series, each of the single cell group being formed by interconnecting a plurality of the single cells electrically in parallel, and the battery module is formed by electrically interconnecting a plurality of the assembled batteries and housing the plurality of electrically interconnected assembled batteries in a module case.

The fifth aspect of the present invention provides An electric vehicle, comprising: a battery module comprising: an assembled battery having a single cell including a power generating element formed by sequentially stacking positive electrode plates and negative electrode plates while interposing separators therebetween; a positive tab connected to the positive electrode plates through a plurality of positive leads; a negative tab connected to the negative electrode plates through a plurality of negative leads; and a cell package formed of a metal composite film, the cell package hermetically sealing the power generating element and an electrolyte, wherein a heat capacity of a portion of the positive tab, onto which a plurality of the positive leads are joined, and a heat capacity of a portion of the negative tab, onto which a plurality of the negative leads are joined, are made larger than that of other portions of the positive tab and the negative tab, the assembled battery is formed by interconnecting any of a plurality of the single cells and a plurality of single cell groups electrically in series, each of the single cell group being formed by interconnecting a plurality of the single cells electrically in parallel, the battery module is formed by electrically interconnecting a plurality of the assembled batteries and housing the plurality of electrically interconnected assembled batteries in a module case, and the battery module is used as a power source of a driving motor driving drive wheels.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, description will be made of embodiments of the present invention with reference to the drawings.

First Embodiment

Figure 1:
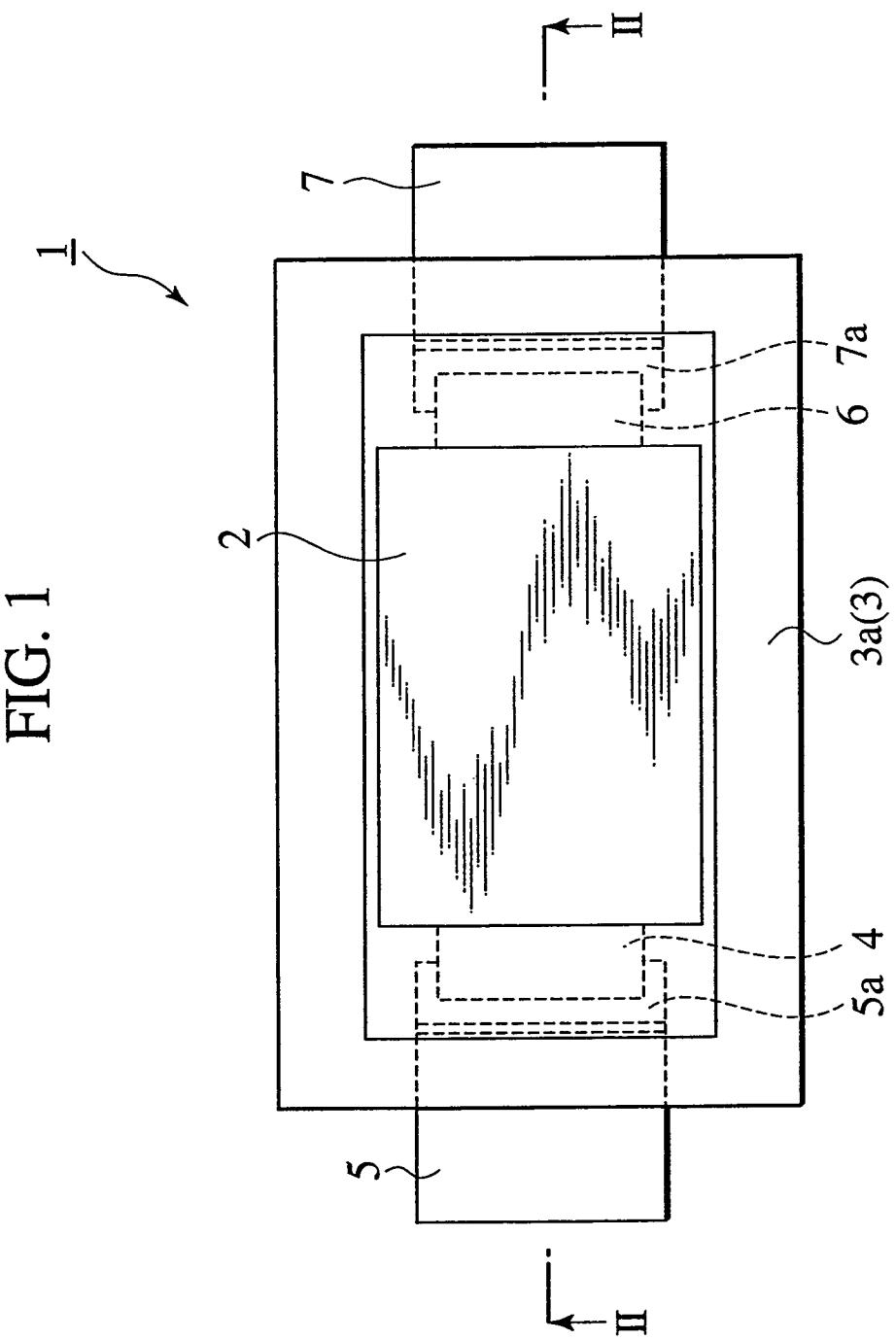
FIG. 1 is a plain view illustrating an example of a laminate cell according to the present invention.
Figure 2:
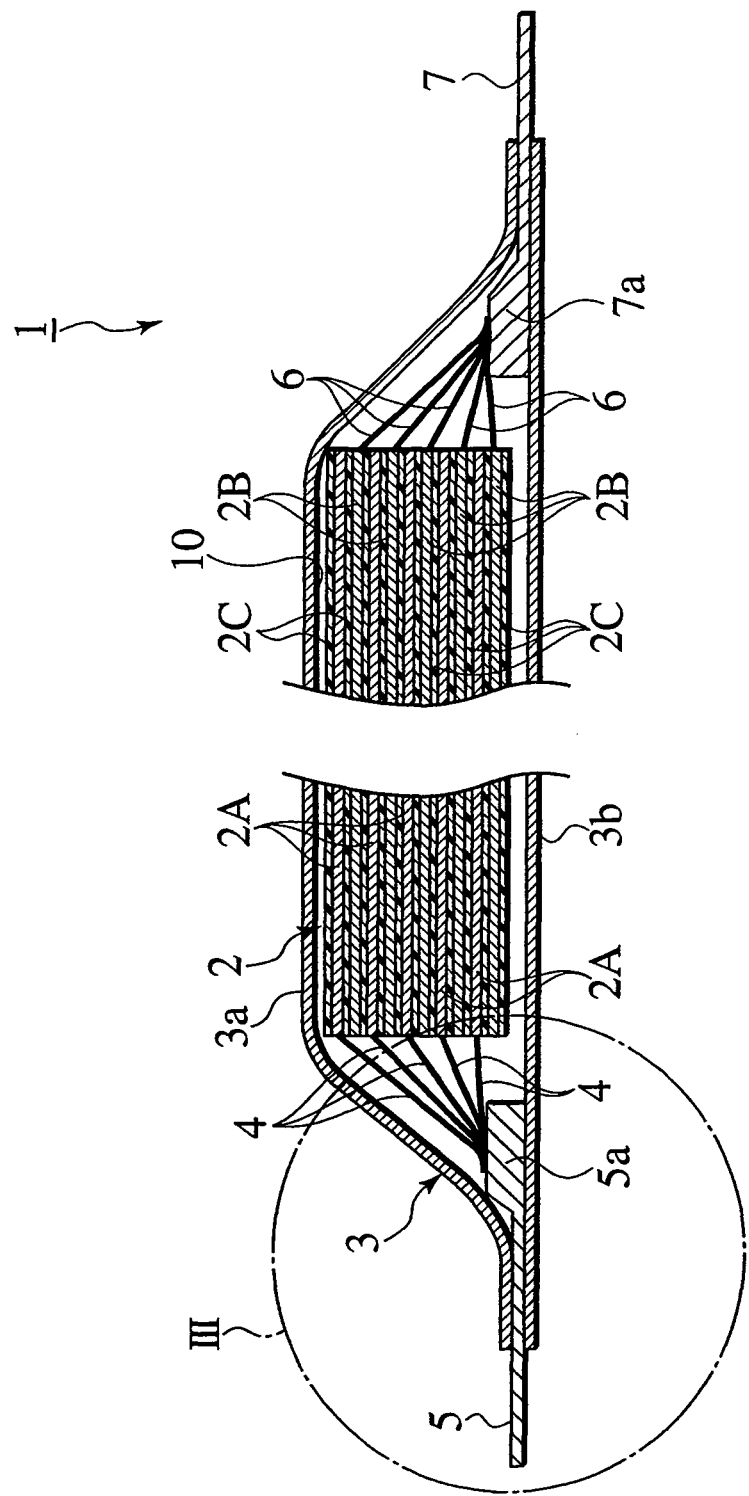
FIG. 2 is a cross sectional view taken on line II-II of FIG. 1.

As illustrated in FIGS. 1 and 2, a laminate cell of this embodiment includes stacked electrodes 2 as a power generating element. The stacked electrode 2 is located at the center between a pair of metal composite films 3a and 3b constituting the cell package 3, and is hermetically sealed together with an electrolyte so as to be sandwiched between the pair of metal composite films 3a and 3b in the thickness direction.

As illustrated in FIG. 2, the stacked electrode 2 as the power generating element is formed by sequentially stacking the pluralities of positive and negative electrode plates 2A and 2B while interposing the separators 2C therebetween. The respective positive electrode plates 2A constituting the stacked electrodes 2 are connected to the positive tab 5 (electrode terminal) through the positive leads 4. Moreover, the respective negative electrode plates 2B constituting the stacked electrodes 2 are connected to the negative tab 7 (electrode terminal) through the negative leads 6.

Each of the positive and negative leads 4 and 6 is formed of metal foil. Specifically, the positive leads 4 are made of aluminum foil, and the negative leads 6 are formed of copper foil. Then, the positive leads drawn from the positive electrode plates 2A are layered and joined onto the positive tab 5 using a technique such as welding. Moreover, the negative leads 6 drawn from the negative electrode plates 2B are layered and joined onto the negative tab 7 using a technique such as welding.

Each of the positive and negative tabs 5 and 7 is formed of a metal plate. Specifically, for example, the positive tab 5 is formed of an aluminum plate, and the negative tab 7 is formed of a nickel plate. Then, one ends of the positive and negative tabs 5 and 7 are drawn outside the cell package 3 and are defined as positive and negative terminals, respectively. Onto the other ends located in the inside of the cell package 3, the plurality of positive leads 4 drawn from the positive electrode plates 2A and the plurality of negative leads 6 drawn from the negative electrode plates 2B are layered and joined individually.

Figure 3:
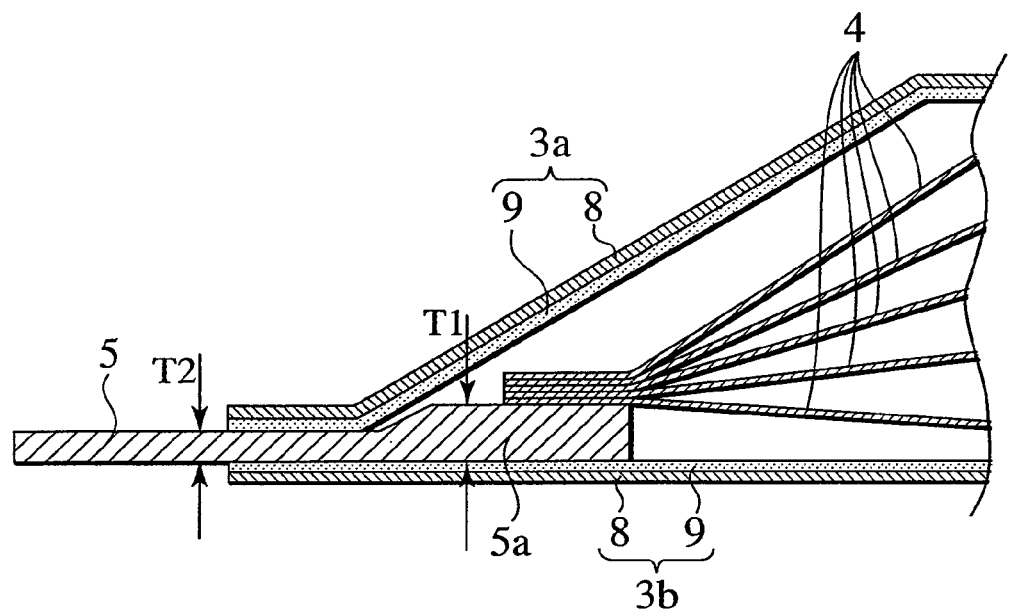
FIG. 3 is an enlarged cross-sectional view of portion III in FIG. 2.

As illustrated in FIG. 3, in the laminate cell 1 of this embodiment, the thickness T1 of the other end (hereinafter, referred to as "junction portion 5a") of the positive tab 5, onto which the plurality of positive leads 4 are layered and joined, is made larger than the thickness T2 of the other portion of the positive tab 5. In addition, the thickness of the other end (hereinafter, referred to as "junction portion 7a") of the negative tab 7, onto which the plurality of negative leads 6 are layered and joined, is made larger than the thickness of the other portion of the negative tab 7 in a similar way. The thicknesses of the junction portions 5a and 7a are made larger, and thus the heat capacities of these junction portions 5a and 7a can be increased, and the temperature increase in the positive and negative tabs 5 and 7 can be controlled even when a large current is carried therethrough.

Specifically, since heat is concentrated in the junction portions 5a and 7a of the positive and negative tabs 5 and 7, the temperatures of the positive and negative tabs 5 and 7 are prone to increase when a large current is carried therethrough. However, in the laminate cell 1 of this embodiment, the thicknesses of these junction portions 5a and 7a are made larger when compared to the other portions' thicknesses, and an increase of the heat capacities thereof is achieved. Therefore, the temperature increase of the positive and negative tabs 5 and 7 can be effectively controlled.

Note that a method for increasing the thicknesses of the junction portions 5a and 7a so as to be larger than those of the other portions is not particularly limited. For example, when metal plates serving as these positive and negative tabs 5 and 7 are formed, the plates may be formed so as to be partially thick, and thickly formed portions may be defined as junction portions 5a and 7a. In addition, metal paste may be partially coated on flat metal plates to increase the thicknesses of portions coated therewith, and these portions may be defined as junction portions 5a and 7a.

As illustrated in FIG. 3, for example, each of the pair of metal composite films 3a and 3b constituting the cell package 3 is formed in the manner described below. The metal layer 8 made of aluminum or the like is used as a base material, the resin layer 9 made of polyethylene (PE), polypropylene (PP) or the like is coated on the inside surface of the metal layer 8, and a protection layer (not shown) such as nylon is adhered onto the outside surface of the metal layer. The metal composite film 3a of the pair of metal composite films 3a and 3b is formed into a cup shape, in which the concave portion 10 housing the stacked electrode 2 is provided on the center portion. The metal composite film 3b is formed flat so as to cover the opening portion of the concave portion 10.

When the laminate cell 1 is fabricated, the stacked electrode 2 is housed together with the electrolyte in the concave portion 10 provided in the metal composite film 3a, and the flat metal composite film 3b is disposed so as to cover the concave portion 10, followed by heat sealing of the outer circumferential portions of the pair of metal composite films 3a and 3b. Thus, a structure is made, in which the stacked electrode 2 is hermetically sealed together with the electrolyte by the cell package 3.

As described above, in the laminate cell 1 thus configured, an increase in the heat capacities of the junction portions 5a and 7a upon which heat is prone to be concentrated when a large current is carried therethrough is achieved, so that the temperature increase of the positive and negative tabs 5 and 7 is controlled. Therefore, high reliability, even when a large current is carried, is ensured.

Specifically, with regard to the laminate cell 1 of conventional technology, when the temperatures of the positive and negative tabs 5 and 7 are excessively increased, it can be assumed that, due to the heat generated in the positive and negative tabs, the resin layers 9 of the metal composite films 3a and 3b are melted, the metal layers 8 thereof are exposed, and a short circuit occurs between the metal layers 8 and the positive or negative tab 5 or 7, or the positive or negative leads 4 or 6 because the metal composite films 3a and 3b are used for the cell package 3. However, in the laminate cell 1 of this embodiment, the thicknesses of the junction portions 5a and 7a are increased so as to be larger than those of the other portions, and thus the heat capacities of these junction portions are increased, and the excessive temperature increase of the positive and negative tabs 5 and 7 is effectively controlled. Therefore, the problems as described above can be avoided, and high reliability can be ensured.

The increase of the entire thicknesses of the positive and negative tabs 5 and 7 is also considered as a method for controlling the temperature increase of the positive and negative tabs 5 and 7. However, in this case, it becomes difficult to ensure the sealing capability on the edges of the cell package 3, from which the positive and negative tabs 5 and 7 are drawn to the outside, sometimes leading to the lowering of durability. On the contrary, in the laminate cell 1 of this embodiment, only the thicknesses of junction portions 5a and 7a of the positive and negative tabs 5 and 7, upon which heat is most concentrated, are made larger. Thus, control of the temperature increase of the positive and negative tabs 5 and 7 is achieved. Accordingly, the above-mentioned problem of the short circuit can be avoided, while maintaining the sealing capabilities on the edges of the cell package 3, and both durability and reliability can be ensured.

The laminate cell 1 of the present embodiment can be employed as a lithium ion secondary battery. Hereinafter, the materials of the lithium ion battery are additionally explained.

As a positive electrode active material forming the positive electrode plate 2A of the stacked electrode 2, a compound is contained that includes lithium nickel composite oxides, in particular, compounds expressed by a general formula $LiNi_{1-x}M_xO_2$. Here, x lies in a range of $0.01 \leq x \leq 0.5$, and M represents at least one element selected from iron (Fe), cobalt (Co), manganese (Mn), copper (Cu), zinc (Zn), aluminum (Al), tin (Sn), boron (B), gallium (Ga), chromium (Cr), vanadium (V), titanium (Ti), magnesium (Mg), calcium (Ca) and strontium (Sr).

Further, the positive electrode may contain positive electrode active material other than the lithium nickel composite oxides. This material may include lithium manganese composite oxides that form compounds expressed by a general formula $Li_yMn_{2-z}M'_zO_4$. Here, y lies in a range of $0.9 \leq y \leq 1.2$ while z lies in a range of $0.01 \leq z \leq 0.5$, and M' represents at least one element selected from Fe, Co, Ni, Cu, Zn, Al, Sn, B, Ga, Cr, V, Ti, Mg, Ca and Sr. Alternately, this material may include lithium cobalt composite oxides that form compounds expressed by a general formula $LiCo_{1-x}M''_xO_2$. Here, x lies in a range of $0.01 \leq x \leq 0.5$, and M'' represents at least one element selected from Fe, Ni, Mn, Cu, Zn, Al, Sn, B, Ga, Cr, V, Ti, Mg, Ca and Sr.

Although there are no particular limitations in the manufacturing methods of the lithium nickel composite oxides, the lithium manganese composite oxides and the lithium cobalt composite oxides, these compounds may be obtained by mixing carbonates such as lithium, nickel, manganese and cobalt at ratios depending on constituents thereof and baking these carbonates in a temperature ranging from 600° C. to 1000° C. Also, the starting materials may not be limited to the carbonates and can also be similarly synthesized from hydroxides, oxides, nitrates and organic acid salts.

Also, the positive electrode material such as the lithium nickel composite oxides and the lithium manganese composite oxides should preferably have an average particle size of 30 μm or below.

Further, the negative electrode plate 2B of the stacked electrode 2 is formed of the negative electrode active material with a specific surface area in a range from 0.05 $m^2$/g to 2 $m^2$/g. As a result of the negative electrode material with the specific surface area of the above range, it is possible to adequately restrict an excessive amount of a solid electrolyte interface layer (SEI layer) from being formed on the negative electrode surface.

With the negative electrode active material having a specific surface area of less than 0.05 $m^2$/g, since the area available for lithium ions to transfer is extremely small, the lithium ions doped into the negative electrode active material during the charging cycle become too hard to be sufficiently doped out from the negative electrode active material during the discharging cycle, resulting in deterioration in the charging and discharging efficiency. Conversely, with the negative electrode active material having a specific surface area of greater than 2 $m^2$/g, it is difficult to control an excessive amount of the SEI layer from being formed on the negative electrode surface.

The negative electrode active material may include any material that allows the lithium ions to be doped into or out of the material at a voltage versus lithium of less than 2.0 volts. More particularly, carbonaceous materials may be used which involve a non-graphitizable carbon material, artificial graphite, natural graphite, pyrolytic graphite, cokes including pitch coke, needle coke and petroleum coke, graphite, glassy carbon, a sintered material of polymers formed by baking and carbonizing phenol resin or furan resin at an appropriate temperature, carbon fiber, activated carbon and carbon black.

Further, a metal, that is able to form an alloy with lithium, and an alloy thereof can also be used and, in particular, these materials include oxide products or nitride products, that allow the lithium ions to be doped into or out of the material at a relatively low voltage potential, such as iron oxide, ruthenium oxide, molybdenum oxide, tungsten oxide, tin oxide and main group elements of group 13. In addition thereto, these materials include elements such as silicon (Si) and tin (Sn), or alloys of Si and Sn represented by a formula $M_xSi$ and $M_xSn$ (wherein M represents more than one metallic element except for Si or Sn). Among these, it is particularly preferable for Si or the Si alloys to be used.

Further, the electrolyte may include a liquid state, a so-called electrolysis solution composed of electrolyte salts dissolved in and adjusted in a non-aqueous solvent, polymer gel electrolyte composed of the electrolyte salt dissolved in the non-aqueous solvent which is retained in a polymer matrix, and polymer electrolyte composed of the electrolyte salt dissolved in the polymer.

When using the polymer gel electrolyte as the non-aqueous electrolyte, the polymer to be used includes poly(vinylidene fluoride) and polyacrylonitrile. Also, when using the polymer electrolyte, a polymer of polyethylene oxide (PEO) may be used.

The non-aqueous solvent may include any kind of solvent if it remains in a non-aqueous solvent heretofore used in a secondary battery using such kinds of non-aqueous electrolyte. As the non-aqueous solvent, propylene carbonate, ethylene carbonate, 1,2-dimethoxyethane, diethyl carbonate, dimethyl carbonate, γ-butyrolactone, tetrahydrofuran, 1,3-dioxolane, 4-methyl-1,3-dioxolane, diethylether, sulfolane, methyl sulfolane, acetonitrile and propionitrile can be used.

Also, these non-aqueous solvents may be used as a single kind or in a mixture of more than two kinds.

Particularly, the non-aqueous solvent should preferably contain an unsaturated carbonate. Particularly, it is more preferable for the non-aqueous solvent to contain vinylene carbonate. The presence of the unsaturated carbonate contained as the non-aqueous solvent enables an effect, derived in the negative electrode active material from the property (a function of a protective layer) of the SEI layer, to be obtained and it is conceivable that an excessive discharging-resistant characteristic is further improved.

Further, the unsaturated carbonate should be preferably contained in the electrolyte in a range from 0.05 wt % to 5 wt % and, more preferably, in a range from 0.5 wt % to 3 wt %. With the amount of content of the unsaturated carbonate being weighed in the above range, a non-aqueous secondary battery is provided which has a high initial discharging capacity with a high energy density.

The electrolyte salt may not be limited to a particular composition provided that it forms a lithium salt presenting an ion conductivity and may include $LiClO_4$, $LiAsF_6$, $LiPF_6$, $LiBF_4$, $LiB(C_6H_5)_4$, LiCl, LiBr, $CH_3SO_3Li$ and $CF_3SO_3Li$. The electrolyte salt may be used as a single kind or may be possibly used in a mixture of more than two kinds.

The laminate cell 1 of the present invention has been specifically described above in a case where the laminate cell 1 is employed as the lithium ion secondary battery. However, the present invention is not limited to the lithium ion secondary battery, and can be applied to a cell having a similar constitution.

Second Embodiment

Next, another embodiment of the laminate cell to which the present invention is applied will be described with reference to FIG. 4.

Figure 4:
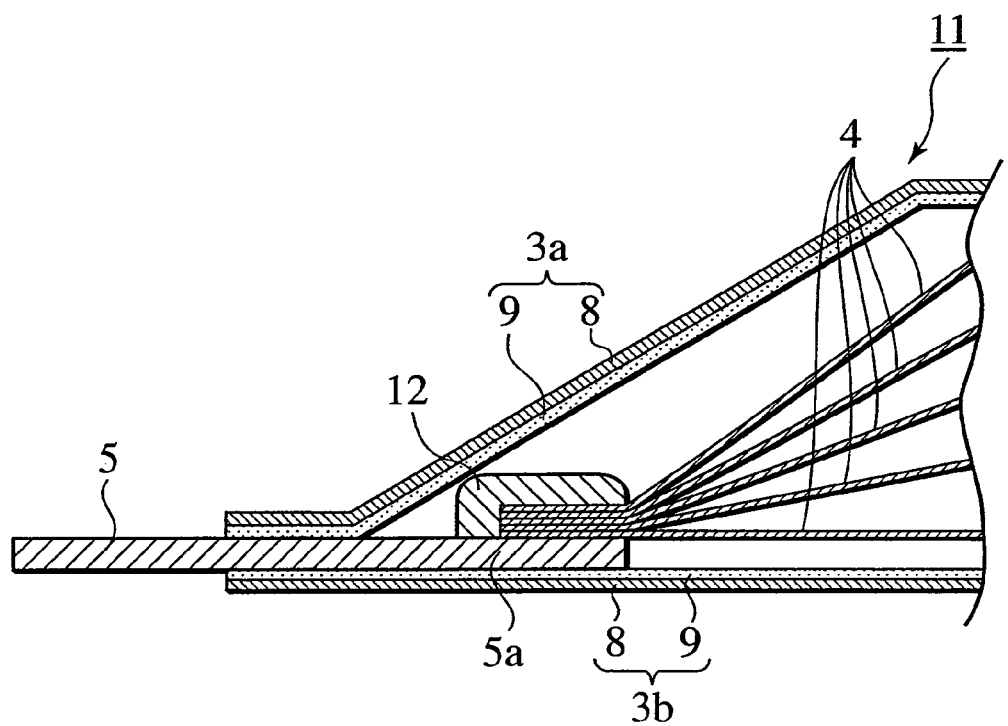
FIG. 4 is a substantially enlarged cross-sectional view illustrating another example of the laminate cell according to the present invention.

As illustrated in FIG. 4, in the laminate cell 11 of this embodiment, a structure is adopted, in which the positive tab 5 is formed flat, and endothermic material 12 is provided on the junction portion 5a of the positive tab 5, onto which the plurality of positive leads 4 are joined. Moreover, though not shown, the negative tab 7 is formed flat in a similar way. The endothermic material 12 is provided on the junction portion 7a of the negative tab 7, onto which the plurality of negative leads 6 are joined. The laminate cell 11 is such that the endothermic material 12 is provided on the junction portions 5a and 7a, and thus the heat capacities of the junction portions 5a and 7a are increased, and it is made possible to effectively control the temperature increase of the positive and negative tabs 5 and 7. Other configurations of the laminate cell 11 are similar to those of the above-mentioned laminate cell 1 of the first embodiment, and therefore, in FIG. 4, the same reference numerals are added to these similar portions, and repeated description will be omitted.

In the laminate cell 11 of this embodiment, the endothermic material 12 provided on the junction portions 5a and 7a is formed by coating a resin having a larger heat capacity per unit weight than those of the positive and negative tabs 5 and 7. As the resin used for the endothermic material 12, for example, polyolefin is listed. Polyolefin has a large heat capacity per unit weight among resins, and is suitable for the endothermic material 12 in the laminate cell 11 of this embodiment.

In the case of using polyolefin as the endothermic material 12 in the laminate cell 11 of this embodiment, this polyolefin may be singly coated on the junction portions 5a and 7a to be used as the endothermic material 12. In addition, other substances may be contained in polyolefin to form a composite material, and this composite material may be coated on the junction portions 5a and 7a to be used as the endothermic material 12.

Specifically, for example, metal particles or ceramic particles may be mixed into polyolefin to form a composite material, and this composite material may be coated onto the junction portions 5a and 7a to be used as the endothermic material 12. The metal particles and the ceramic particles have extremely large heat capacities. Therefore, in the case of using the composite material in which the metal or ceramic particles, as described above, are mixed into polyolefin, the heat capacities of the junction portions 5a and 7a can be further increased.

In addition, for example, a phase change material absorbing heat by a phase change may be mixed as microparticle or microcapsules into polyolefin to form the composite material, and this composite material may be coated on the junction portions 5a and the junction portion 7a to be used as the endothermic material 12. The phase change material exerts an endothermic function when a phase change occurs following the temperature increase. Accordingly, in the case of using the composite material in which the phase change material as described above is mixed as microparticles or microcapsules into polyolefin, the heat capacities of the junction portions 5a and 7a can be further increased. It is satisfactory for the preparation of the phase change material into the microcapsules, to be performed by a known method such as, for example, a method for forming a coating film by coating appropriate microparticles on a solid phase change material by means of an air suspension coating process.

As described above, in the laminate cell 11 thus configured, endothermic material 12 is provided on the junction portions 5a and 7a on which heat is prone to be concentrated when a large current is carried therethrough, the increase of the heat capacities of the junction portions 5a and 7a is achieved, and the temperature increase of the positive and negative tabs 5 and 7 is controlled. Accordingly, high reliability, even when a large current is carried, can be realized similarly to the above-mentioned laminate cell 11 of the first embodiment.

In addition, in the laminate cell 11 of the embodiment, resin having a larger heat capacity per unit weight in comparison with those of the positive and negative tabs 5 and 7 is coated on the junction portions 5a and 7a to be used as endothermic material 12. This is advantageous in reducing the entire weight of the laminate cell 11.

Third Embodiment

Next, another embodiment of the laminate cell to which the present invention is applied will be described with reference to FIG. 5.

Figure 5:
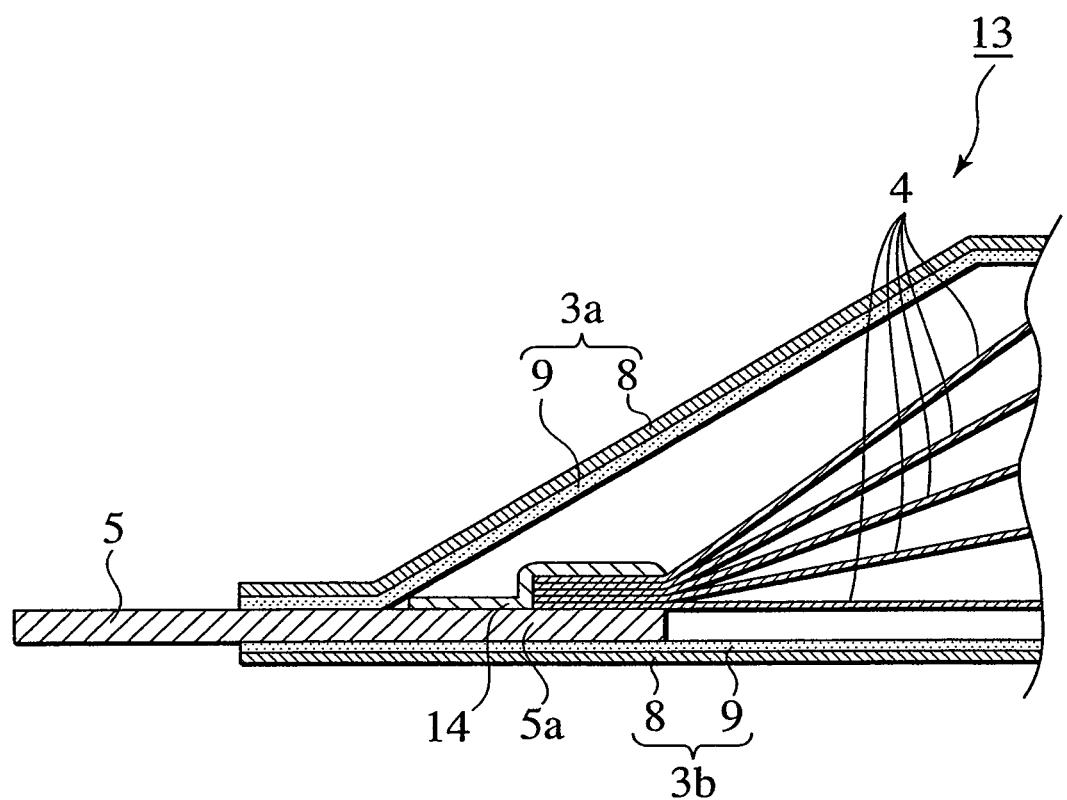
FIG. 5 is a substantially enlarged cross-sectional view illustrating another example of the laminate cell according to the present invention.

As illustrated in FIG. 5, in the laminate cell 13 of this embodiment, a structure is made, in which the insulating tape 14 having an electrical insulating property is adhered to the junction portion 5a of the positive tab 5, onto which the plurality of positive leads 4 are joined, and to vicinities thereof. Moreover, though not shown, the insulating tape 14 is adhered to the junction portion 7a of the negative tab 7, onto which the plurality of negative leads 6 are joined, and to vicinities thereof. Even if the resin layer 9 of the metal composite film 3a constituting the cell package 3 is melted and the metal layer 8 is exposed due to a temperature increase of the positive and negative tabs 5 and 7, the insulating tapes 14 are adhered to the junction portions 5a and 7a. Accordingly, the metal layer 8 and the positive or negative tab 5 or 7, or the positive or negative lead 4 or 6 can be insulated by the insulating tape 14, and the problem of the occurrence of a short circuit therebetween can be avoided. Other configurations in this laminate cell 13 are similar to those of the above-mentioned laminate cell 1 of the first embodiment and laminate cell 11 of the second embodiment. Therefore, in FIG. 5, the same reference numerals are added to these similar portions, and repeated description will be omitted.

In the laminate cell 13 of this embodiment, for the insulating tape 14, any kind can be used, if a good electrical insulating property can be obtained. For example, Kapton® tape (polyimide tape) and the like are suitable. This type of insulating tape 14 has excellent handling, and electrical insulation in the portion to be insulated is obtained by adhering the insulating tape 14 thereto. The laminate cell 13 of this embodiment adopts a structure, in which the insulating tapes 14 as described above are adhered to the junction portions 5a and 7a. Accordingly, a countermeasure against the case where the metal layer 8 of the metal composite film 3a is exposed can be simply taken, without the need for extra production work as regards the laminate cell 13.

The laminate cell 13 of this embodiment may be realized in a form where the above-mentioned laminate cell 1 of the first embodiment or laminate cell 11 of the second embodiment are combined. Specifically, after increasing the thicknesses of the junction portions 5a and 7a so as to be larger than those of the other portions, the insulating tapes 14 may be further adhered to the junction portions 5a and 7a. Moreover, after providing endothermic material 12 on the junction portions 5a and 7a, the insulating tapes 14 may be further adhered to the endothermic materials 12. In these cases, a short circuit due to the temperature increase of the positive and negative tabs 5 and 7 can be more securely prevented, and further enhancement in reliability can be realized.

Fourth Embodiment

Figure 6:
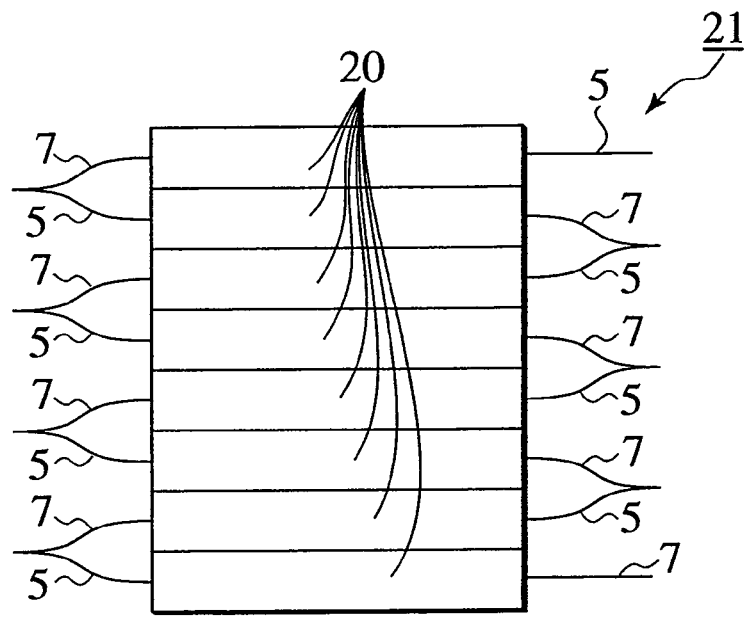
FIG. 6 is a side view illustrating an example of an assembled battery according to the present invention.

Next, an assembled battery composed of the laminate cells to which the present invention is applied will be described with reference to FIGS. 6 and 7. FIG. 6 illustrates the assembled battery 21 composed by interconnecting the plurality of single cells 20 electrically in series, in which the laminate cells (laminate cells 1, 10 or 13 mentioned above) to which the present invention is applied are made as the single cells 20. Meanwhile, FIG. 7 illustrates the assembled battery 23 composed by interconnecting the plurality of single cell groups 22 electrically in series, in which the plurality of single cells 20 are interconnected electrically in parallel so as to make the single cell groups 22.

The assembled battery 21 illustrated in FIG. 6 is formed by stacking and integrating the plurality of single cells 20 in the thickness direction. The respective single cells 20 constituting the assembled battery 21 are stacked such that the directions of the positive and negative tabs 5 and 7 of the adjacent single cells 20 alternate. With regard to a single cell 20 in which other single cells 20 are stacked on both sides in the thickness direction, respectively, the positive tab 5 of said single cell 20 is joined to the negative tab 7 of one of the adjacent single cells 20 by a technique such as ultrasonic bonding, and the negative tab 7 thereof is joined to the positive tab 5 of the other adjacent single cell 20. In such a way, the positive and negative tabs 5 and 7 of all of the single cells 20 are joined to the negative and positive tabs 7 and 5 of the adjacent single cells 20, respectively, and thus the integrated assembled battery 21 in which the respective single cells 20 are interconnected electrically in series is composed.

Figure 7:
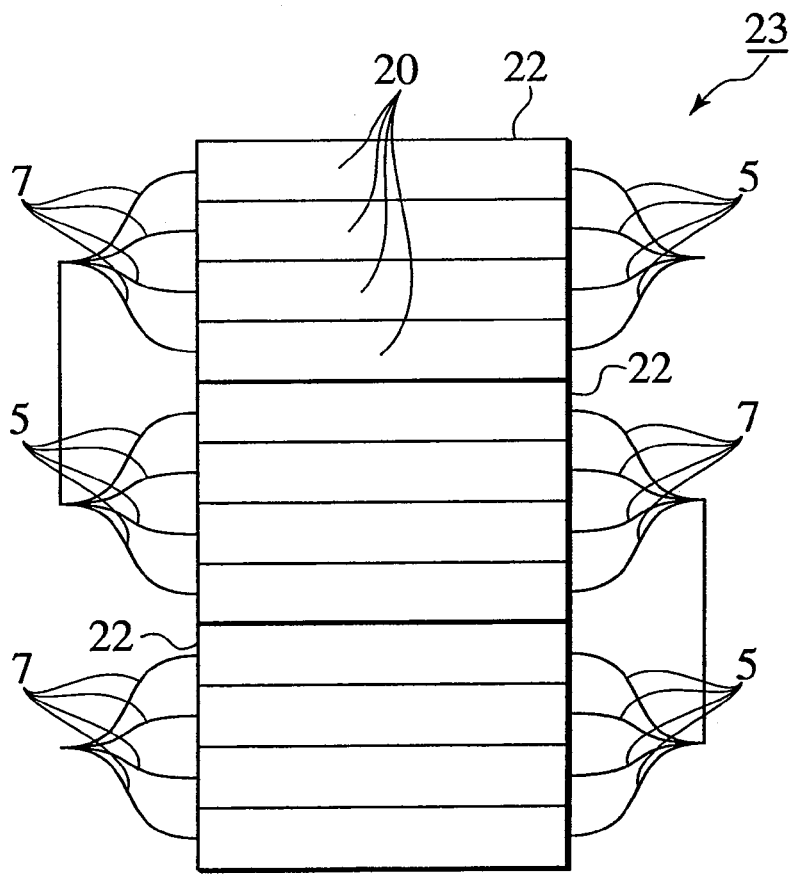
FIG. 7 is a side view illustrating another example of the assembled battery according to the present invention.

Meanwhile, the assembled battery 23 illustrated in FIG. 7 is composed by combining the single cell groups 22, each of which is formed by interconnecting the plurality of single cells 20 electrically in parallel. The plurality of single cells 20 are stacked such that the directions of the positive and negative tabs 5 and 7 of the adjacent single cells 20 is the same, and the positive tabs 5 and negative tabs 7 of these single cells 20 are individually interconnected by a technique such as the ultrasonic bonding. Thus, the single cell groups constituting the assembled battery 23 are formed by interconnecting the single cells 20 electrically in parallel. Then, the single cell groups 22 thus constituted as aggregations of the plurality of single cells 20 are stacked such that the directions of the positive and negative tabs 5 and 7 of the adjacent single cell groups 22 alternate. With regard to a single cell group 22 in which other single cell groups 22 are layered on both sides in the thickness direction, respectively, the positive tabs 5 of said single cell group 22 are connected to the negative tabs 7 of one of the adjacent single cell groups 22. Meanwhile, the negative tabs 7 of said single cell group 22 are connected to the positive tabs 5 of the other adjacent single cell group 22. In such a way, the positive and negative tabs 5 and 7 of all of the single cell groups 22 are connected to the negative and positive tabs 7 and 5 of the adjacent single cell groups 22, respectively, and thus the integrated assembled battery 23 in which the respective single cell groups 22 are interconnected electrically in series is composed.

Note that the number of single cells 20 constituting the assembled batteries 21, 23 as described above is arbitrary, and it is satisfactory to set the number appropriately in accordance with the purpose of the concerned assembled batteries 21 and 23.

In the assembled batteries 21 and 23 thus constituted, the plurality of single cells 20 are compactly identified, and therefore, energy efficiency per unit volume is high. In this connection, it is possible to apply the assembled batteries 21 and 23 to a variety of purposes. Particularly, as each of the single cells 20 constituting the assembled batteries 21 and 23, the laminate cell 1 or 11, in which the temperature increase in the positive and negative tabs 5 and 7 can be controlled; and the laminate cell 13, in which insulating tape is adhered to the junction portions of the positive and negative tabs 5 and 7, are used. Thus, high reliability, even when a large current is carried, is ensured for each of the single cells 20. Therefore, the assembled batteries 21 and 23 are suitable for, for example, use in an electric vehicle regarding high power.

Fifth Embodiment

Figure 8:
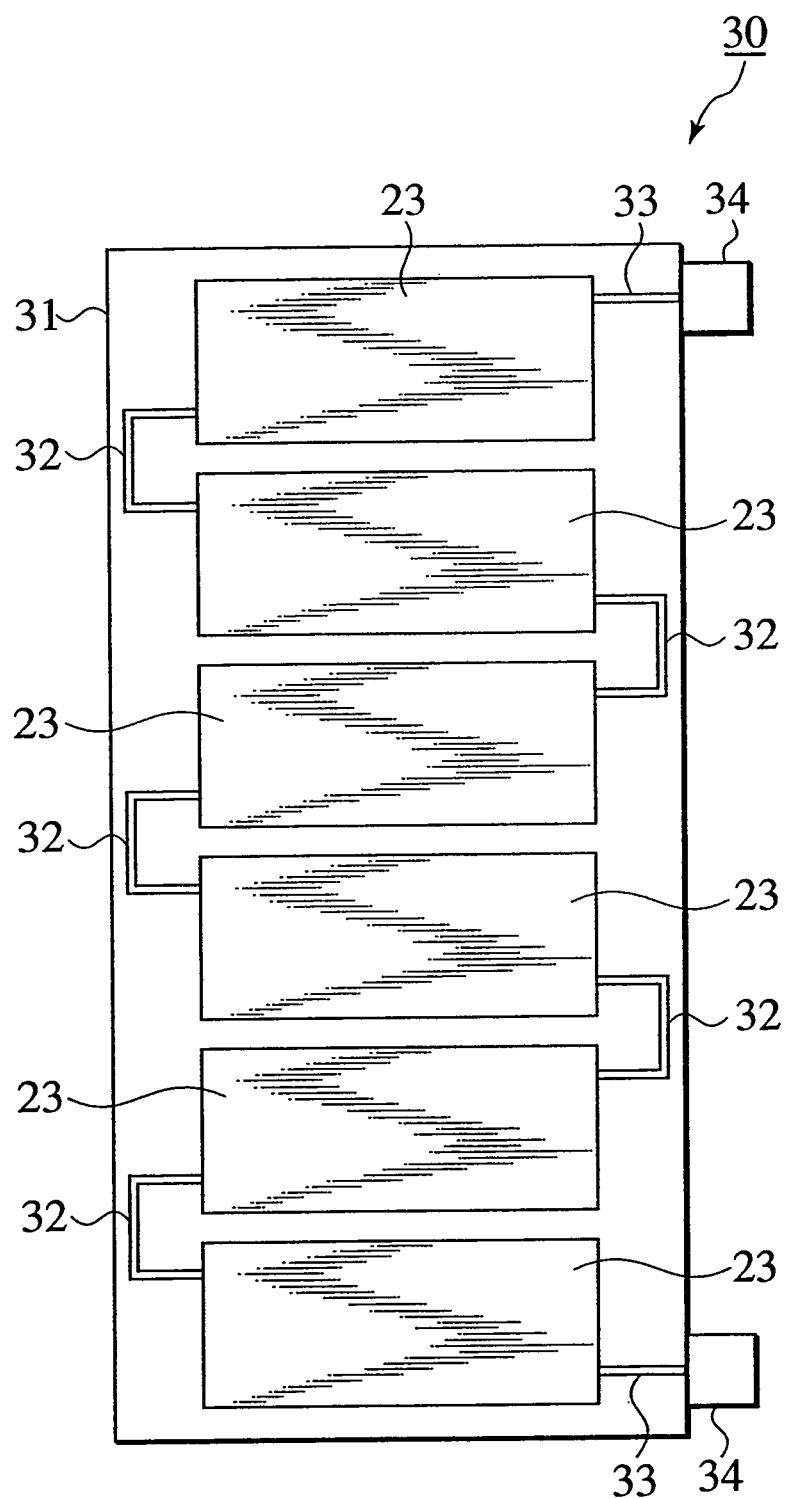
FIG. 8 is a plan view illustrating a battery module according to the present invention.

Next, an example of a battery module composed of the assembled batteries 21 or 23 as described above will be described with reference to FIG. 8. FIG. 8 illustrates the battery module 30 having a structure in which the plurality of assembled batteries 23 illustrated in FIG. 7 are interconnected electrically in series. Note that the assembled batteries 21 constructed as illustrated in FIG. 6 may also be used. In addition, the connection mode of the plurality of assembled batteries is not limited to the serial connection, but any mode including parallel connection, parallel-serial connection, serial-parallel connection and the like may be adopted. Moreover, the number of assembled batteries constituting the battery module 30 is also arbitrary and may be appropriately set in accordance with the purpose of the concerned battery module 30.

The battery module 30 of this embodiment is constructed in such a manner that the box-shaped module case 31 is provided and that the plurality of assembled batteries 23 are housed in the module case 31 in a state wherein they are interconnected electrically in series. The respective terminals (aggregate positive and negative tabs 5 and 7) of each of the assembled batteries 23 housed in the module case 31 are connected to the terminals of the adjacent assembled batteries 23 through the busbars 32. Then, the terminals of the assembled batteries 23 disposed on the outermost sides among the plurality of assembled batteries 23 are connected to the external terminals 34 provided on the outside surface of the module case 31.

In the battery module 30 thus constituted, the assembled batteries 23 having high energy efficiency per unit volume are housed in the module case 31 and are integrated in one body. Therefore, the battery module 30 is highly powered, compact and has excellent handling. Particularly, for the single cells 20 constituting the respective assembled batteries 23 housed in the module case 31, the laminate cell 1 or 11, in which the temperature increase in the positive and negative tabs 5 and 7 can be controlled, and the laminate cell 13, in which insulating tape is adhered to the junction portions of the positive and negative tabs 5 and 7, are used. Therefore, high reliability, even when a large current is carried, is ensured for each of the single cells 20. In this connection, the battery module 30 is suitable for, for example, use in an electric vehicle regarding high power.

Sixth Embodiment

Figure 9:
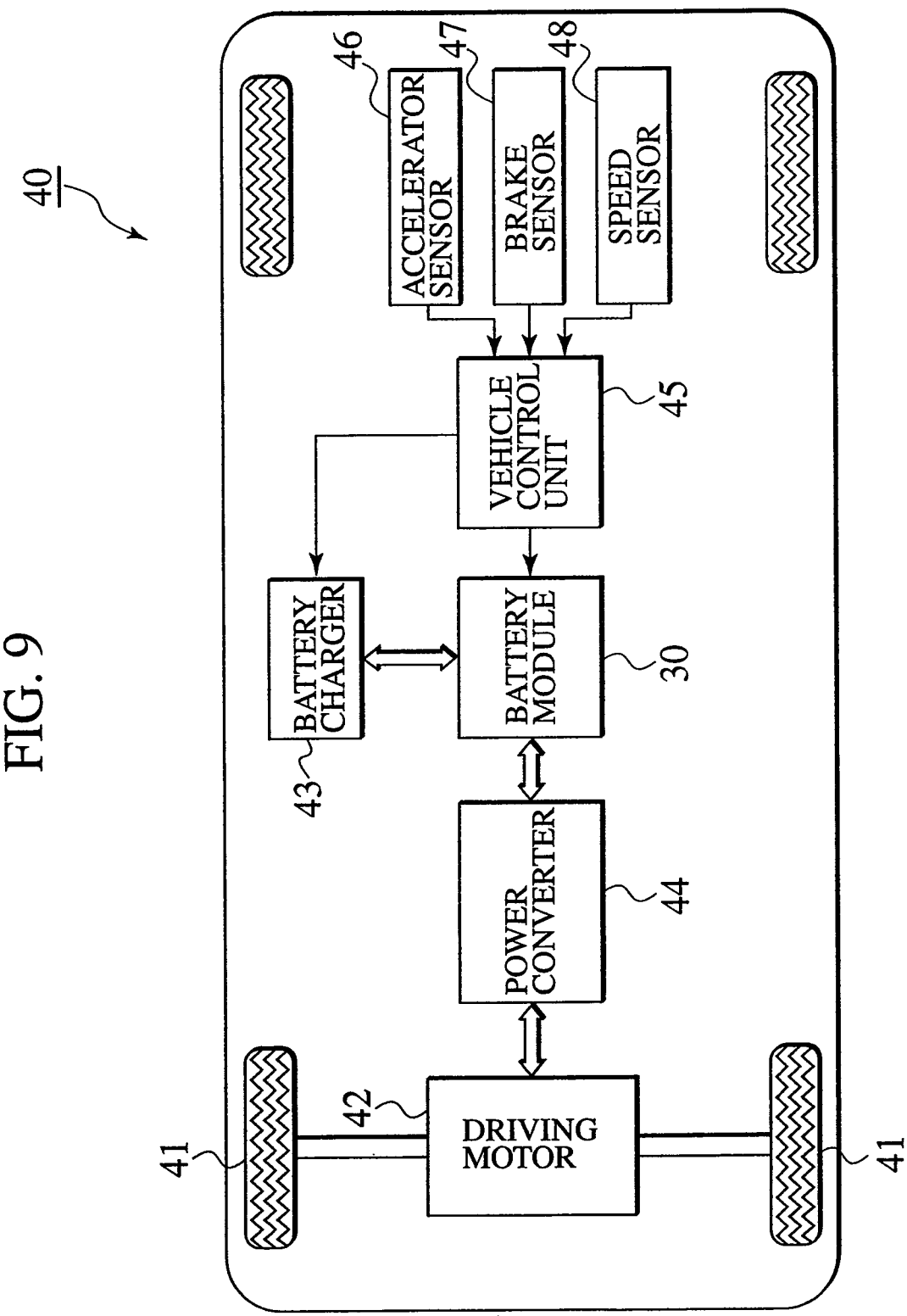
FIG. 9 is a block diagram schematically illustrating a drive source of an electric vehicle according to the present invention.

Next, an example of an electric vehicle having the battery module 30 as described above mounted thereon will be described with reference to FIG. 9. FIG. 9 schematically illustrates the drive system of the electric vehicle 40 of this embodiment.

As illustrated in FIG. 9, in the electric vehicle 40 of this embodiment, the above-described battery module 30 is used as a power source for the driving motor 42 driving the drive wheels 41. This battery module 30 is designed to be charged by the battery charger 43, and supplies predetermined power to the driving motor 42 through the power converter 44 according to needs. In addition, the battery module 30 is charged by regenerated power generated by a regenerative braking of the driving motor 42.

The charge/discharge of the battery module 30 is controlled by the vehicle control unit 45. Specifically, the vehicle control unit 45 calculates a power quantity required for the driving motor 42 based on outputs from various sensors such as the accelerator sensor 46, the brake sensor 47 and the speed sensor 48. Based on the calculated power quantity, the vehicle control unit 45 controls a power supply from the battery module 30 to the driving motor 42. In addition, the vehicle control unit 45 monitors the charge state of the battery module 30, and controls a charge from the battery charger 43 such that the charge state of the battery module 30 is maintained in an appropriate state.

In the electric vehicle 40 thus constituted, the battery module 30, which is highly powered, compact and has excellent handling, is used as the power source of the driving motor 42 driving the drive wheels 41. Particularly, as for each of the single cells constituting the assembled batteries in this module, the laminate cell, in which the temperature increase in the positive and negative tabs can be controlled, and the laminate cell, in which insulating tape is adhered to the junction portions of the positive and negative tabs, are used. Thus, high reliability, even when a large current is carried is ensured for each of the single cells, and high running performance can be realized.

Note that, though the above has been described by taking, as an example, the electric vehicle 40 which runs driven by the driving motor 42, it is also possible to apply the present invention to a so-called hybrid car which runs via a combination of an engine and the driving motor. Specifically, also in the case where the present invention is applied to the hybrid car, the battery module 30 as described above can be used as the power source of the driving motor.

The entire content of Japanese Patent Application No. P2002-245539 with a filing date of Aug. 26, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A method of manufacturing a laminate cell comprising:
   a power generating element formed by sequentially stacking positive electrode plates and negative electrode plates while interposing separators therebetween;
   a positive tab connected to the positive electrode plates through a plurality of positive leads;
   a negative tab connected to the negative electrode plates through a plurality of negative leads; and
   a cell package hermetically sealing the power generating element and an electrolyte, wherein a heat capacity of portions of the positive and negative tabs, to which the positive and negative leads are joined respectively, is made larger than that of other portions thereof, the method comprising:
   preparing the positive and negative tabs which are thicker at the portions where the positive and negative leads are joined to the positive and negative tabs, respectively, than the other portions of the positive and negative tabs extending outside the laminate cell, the positive and negative tab being formed of a single layer; and
   joining the positive and negative leads to the portion of the positive and negative tabs, respectively.

2. The method of claim 1, further comprising:
   housing the power generating element with the electrolyte in a pair of metal composite films of the cell package; and
   heat-sealing outer circumferential portions of the pair of metal composite films.

3. A method of manufacturing a laminate cell comprising:
   a power generating element formed by sequentially stacking positive electrode plates and negative electrode plates while interposing separators therebetween;
   a positive tab connected to the positive electrode plates through a plurality of positive leads;
   a negative tab connected to the negative electrode plates through a plurality of negative leads; and
   a cell package hermetically sealing the power generating element and an electrolyte, wherein a heat capacity of portions of the positive and negative tabs, to which the positive and negative leads are joined respectively, is made larger than that of other portions thereof, the method comprising:
   preparing the positive and negative tabs which are thicker at the portions where the positive and negative leads are joined to the positive and negative tabs, respectively, than the other portions of the positive and negative tabs extending outside the laminate cell, the portions of the positive and negative tabs, to which the positive and negative leads are joined respectively, being formed of a single layer; and
   joining the positive and negative leads to the portion of the positive and negative tabs, respectively.

* * * * *